UNITED STATES PATENT OFFICE.

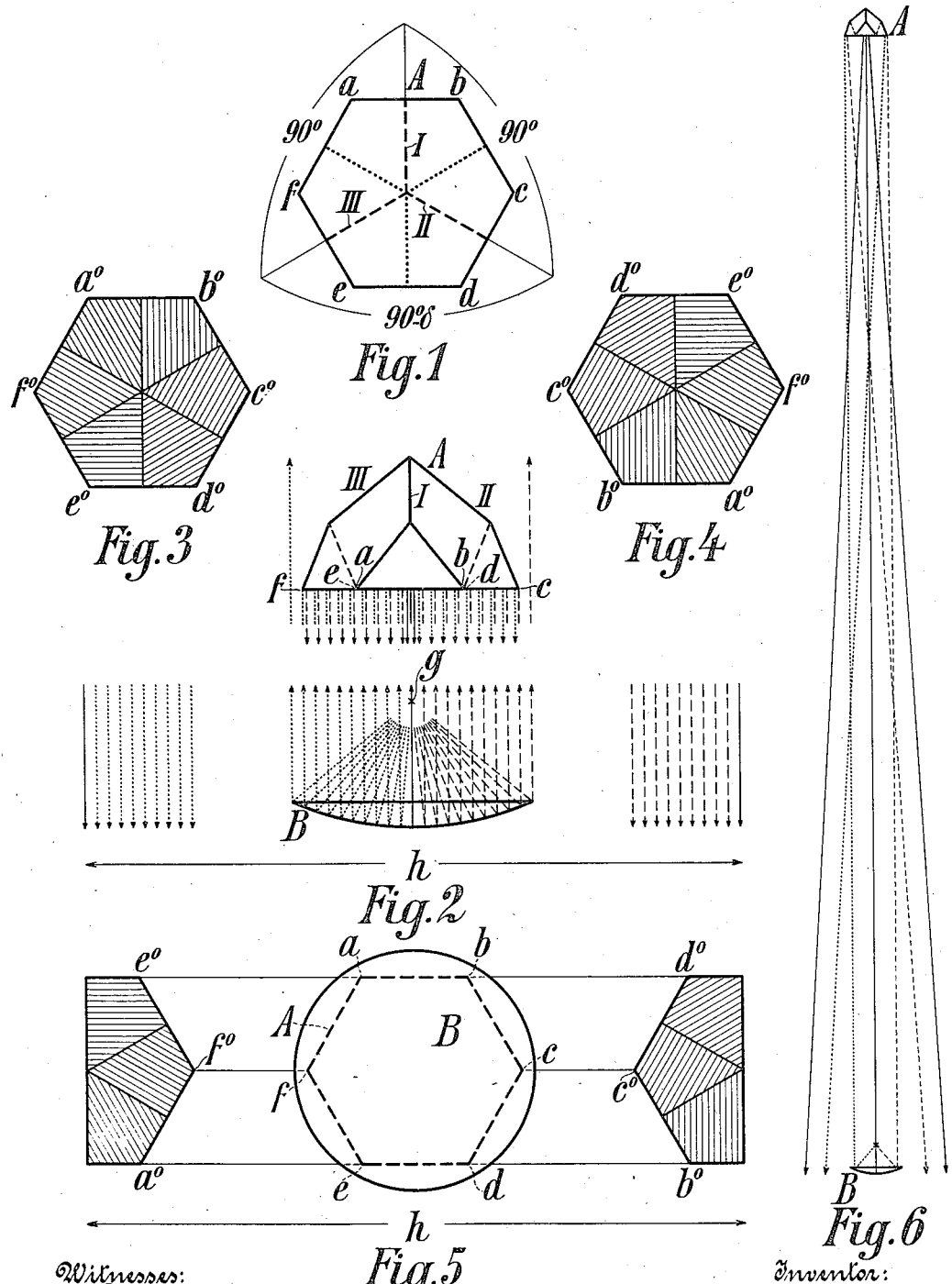

RUDOLF STRAUBEL, OF JENA, GERMANY, ASSIGNOR TO THE FIRM OF CARL ZEISS, OF JENA, GERMANY.

APPLIANCE FOR MEASURING DISTANCES.

No. 897,174.      Specification of Letters Patent.      Patented Aug. 25, 1908.

Application filed March 13, 1906. Serial No. 305,875.

*To all whom it may concern:*

Be it known that I, RUDOLF STRAUBEL, doctor of philosophy, a citizen of the German Empire, and residing at Carl-Zeiss strasse, Jena, in the Grand Duchy of Saxe-Weimar, Germany, have invented a new and useful Appliance for Measuring Distances, of which the following is a specification.

In the appliance for measuring distances, which forms the subject matter of the present invention, a triple-reflector is made use of as object. The triple-reflector (tripelspiegel) has been described by A. Beck in 1887 in the "*Zeitschrift für Instrumentenkunde*". It is a system of three plane mirrors upon which light impinges successively. A special form is the central-reflector (zentralspiegel), distinguished by the three planes lying at right angles to each other. The central-reflector has the property of reflecting light along the same path that it entered the reflector. It will be seen that because of this property the central-reflector is inappropriate to the object of the present invention. In the British specification No. 21856 of 1903 H. Grubb treats of the applications of this central-reflector. He describes *inter alia* its use for the measurement of distances by night, and in the following words: "For obtaining ranges at night, the reflecting device is carried by a person at the place the range of which is required and is so held as to receive the luminous rays from a source of light exposed at the place where the range finder is located".

In contradistinction to Grubb's idea, the appliance for measuring distances according to the present invention is more simple, as it comprises only two essential components, the source of light at the place of observation and the triple-reflector at the target; the range finder being dispensed with. Moreover the triple-reflector is no central-reflector and is not only made use of as radiating object, but itself carries one of the terms, which serve to measure the distance, the angles between an incident pencil of light and its partial pencils reflected back again, or between these latter, acting in the capacity of angles of convergence. If these angles be known, it is only necessary at the place of observation to determine the linear distance between one partial pencil and another partial pencil (hereinafter designated "pencil-distance") and the inclination of this line to one of the pencils in order to obtain by a well-known calculation the distance of the triple-reflector from the place of observation.

If the base line, that is, the line joining the two pencils, be made equally inclined to the two pencils—almost at right angles, on account of the smallness of the angle of convergence—there results the distance required between triple-reflector and base line as the quotient derived from the pencil-distance (more exactly, the pencil-distance at the place of observation, plus or minus the pencil-distance at the reflector) and the angle of convergence between the pencils.

As already laid down by A. Beck, out of one ray, which is incident upon the intersecting point of the three mirror surfaces—the center of the triple-reflector—there arise six partial rays for the location of which the following applies. If the incident ray be rotated in either sense about each of three "axes of rotation", which passing through the center of the reflector have a variable position according to the angles formed by the three mirrors of the triple-reflector, and each time through an angle, which likewise depends upon the mirror angles and may be called "magnitude of rotation", the said incident ray takes up the places of the six reflected partial rays one after the other. To each axis of rotation consequently correspond two rays, which lie symmetrical to the plane passing through the incident ray and the axis of rotation. If the magnitude of rotation be small, the two rays appertaining to the axis of rotation lie almost in one plane, and the incident ray halves the angle between the two partial rays. Then the six partial rays lie approximately in pairs in three planes, which intersect each other along the incident ray. As at the same time the six rays lie in pairs symmetrically to the incident ray, instead of measuring the distance between two paired partial rays, it suffices to measure the distance, half so great, of one or other of the partial rays from the incident ray.

For any incident ray whatever, which does not pass through the center of the triple-reflector, the places of the six partial rays are deduced from the consideration, that to one incident pencil of parallel rays there must be six emerging pencils of parallel rays to correspond. The directions of the partial rays, for any incident ray not passing through the center of the reflector, are therefore the same as for the ray passing through the center. For the complete determination of the places of the six partial rays, it is consequently only necessary to determine one point for each partial ray, through which the ray must pass. As such six points the image points, which would be produced by the triple-reflector from any point of the incident ray may be used. They can be found in the simplest way, if a straight line be drawn through the object point in the incident ray and the center of the reflector and to this line as to an auxiliary incident ray the six partial rays be constructed. The required image points lie in these auxiliary partial rays at the same distance from the center of the reflector as the object point.

Knowing a single constant of the triple-reflector, for example, a single angle of the reflector, is sufficient to determine its other constants and its distance from the place of observation, provided that the pencil-distance at the place of observation is large as compared with the pencil-distance at the reflector. Under the term "constants of the triple-reflector" is to be understood, firstly, the constants of construction, namely, the three angles of the reflector, and secondly, three constants of orientation independent one of another, for example, two independent angles necessary for the determination of the direction of one edge of the reflector and one of the angles of another edge. In addition to one such constant of the reflector, it must be known to which axis of rotation the pencils made use of are coördinated. The coördination of the pencils to the axes of rotation becomes apparent through each measurement, which exceeds the number of measurements necessary in case that coördination is otherwise known.

One constant of the triple-reflector must necessarily be known to measure the distance, even if all six pencils be measurable. In most cases all the constants of construction can be taken as known. On the other hand, it may be of interest to determine the distance with only one known constant of the reflector, that is, when this constant relates to the orientation of the reflector, for example, to the inclination of one of its axes of rotation to the incident pencil.

For the case first mentioned—that all the constants of construction of the triple-reflector are known—there may be specified how many and what measurements are to be undertaken with the pencils for the determination of distance, since this case is relatively simple and at the same time practically important. It is of course to be understood that at least one pencil-distance must be measured to serve directly or indirectly as base line. Since the angles of convergence of the pencils are dependent upon the position of the incident pencil to the axes of rotation and this position necessitates at least two data for its determination, there are besides the pencil-distance at least two angles still to be measured. These two angles must be only such as refer to the places of the pencils relatively to each other, where each angle can be substituted by a proportion of pencil-distances. The minimum of three measurements can then be performed in three different ways: There can be measured: (a) three pencil-distances, for example, those of all the three pairs of pencils, (b) one pencil-distance and any two angles, for example, the pencil-distance of a pair and two angles between the planes of the three pairs of pencils, (c) two pencil-distances and any angle, for example, the pencil-distances of two pairs and the angle between the planes of these two pairs of pencils.

Since not all the data, which determine the places of the pencils relatively to each other, but only three of them independent one of another, are to be measured, only three pencils need to be accessible for measurement. Further, according to what has been said above, since the incident pencil lies midway between the two pencils of a pencil-pair, one partial pencil can at once be substituted by the incident pencil, and the distance determined with only two pencils accessible for measurement, but not appertaining to one and the same pair.

It is of value that only three pencils are needed, knowing the coördination of the axes of rotation to the pencil-pairs—by having recourse to the incident pencil or the locus of the source of light even only two not appertaining to one and the same pair—when the place of observation is limited as to space, and further, when in consequence of coalescence not all the pencils appear separated. If there exist only four pencils, it is no longer uncertain which two axes of rotation come into consideration, for in this case there are only two axes of rotation at all.

If the triple-reflector be filled up with a medium, which is more highly refractive than air and limited, moreover, by a plane entrance—and exit surface (hereinafter designated "entrance-surface") as for instance, with a tetrahedron of glass—which can, however, also completely take the place of the triple-reflector—the conditions as regards the measurement of distance do not quite remain the same as before. However, knowing the construction of the tetrahedron, the places of the emerging pencils present sufficient data for determining its orientation with regard to the observer. Very simple and similar as in the case of the triple-reflector proper, are the determinations, if the incident and the emerging pencils impinge approximately perpendicularly upon the entrance-surface of the tetrahedron. The angles of convergence differ in this case from those, which would correspond to the triple-reflector, only in proportion to the index of refraction of the tetrahedron.

The orientation of the triple-reflector relatively to the observer is, deviating from the former supposition, in most cases wholly or in part known to the observer or can be even arbitrarily chosen by him. In all such cases it will be possible to determine the distance in a simpler manner. If the observer or the triple-reflector can move only in the plane, in which the triple-reflector or the observer is likewise situated, the angle of convergence of a pair of pencils can be made completely independent of the position of the incident pencil relatively to the triple-reflector, so that the distance is found forthwith from the pencil-distance of this pair. This is then exactly attained, if one of the axes of rotation lie at right angles to the above plane. If in this case the reflector and the observer be not both in the plane of movement, but the incident pencil deviate 8° or less towards one side or the other of this plane, that is, within a region of 16°, there would result an error of 0.5 per cent. in the distance at most. Incidentally it may be said that in the triple-reflector one axis of rotation need not absolutely lie perpendicular to the plane of movement, in order to simply find the distance. For, if it lie, for instance, inclined to the horizon, which may be the plane of movement, the angle of convergence of the pencil-pair will then be dependent upon the azimuth of the place of observation; its projection to the horizon will, however, be independent of the azimuth and only dependent upon the inclination of the axis of rotation to the horizon.

In the tetrahedron the entrance-surface would be placed most suitably perpendicular to the plane of movement. There are two limiting cases to be taken into consideration for the position of the axes of rotation in the tetrahedron, viz., one case in which one axis of rotation lies perpendicular to the plane of movement and the other in which one axis lies in this plane. If one axis of rotation lie perpendicular to the plane of movement and parallel to the entrance-surface, then upon emergence of the pencil-pair belonging to this axis into air there occurs an increase of divergence dependent upon the angle of incidence, and therefore the inclination of the incident pencil with regard to the entrance-surface is needed to be known to determine the distance. It is easily found however, that for an index of refraction of 1.5 within a region of 40° about perpendicular incidence, the maximum error does not exceed 2 per cent., and within a region of 50° 3 per cent. If the angle between the entrance-surface and the incident pencil be determined approximately by the aid of a further measurement, then these two amounts can be somewhat reduced. If on the other hand one axis of rotation lie in the plane of movement, to which the entrance-surface is at right angles, there occurs upon emergence into air one constant increase in the divergence of the pencil-pair, dependent only upon the index of refraction. It is necessary, however, in order to determine the distance, that the angle between the incident pencil and the said axis of rotation is known, since the angle of convergence of the pencil-pair (in small magnitude of rotation) is proportional to the sine of this angle. If yet a second axis of rotation be laid exactly or approximately in the plane of movement, and if the angle between the two axes of rotation be known, then from the three data, the angle, the magnitude of rotation and the index of refraction, the distance and the azimuth could be found. It is better, however, to have one axis of rotation lying perpendicular to the plane of movement and one lying in it—more especially on account of the intensity of light. If the index of refraction and the inclination of the entrance-surface to the axis of rotation lying in the plane of movement be known, the relation between the pencil-distances supplies the angle of incidence in a very simple manner. For the determination of the direction, the magnitude of rotation, difficult of measurement in consequence of its diminutive size, need not be known. If such cases be dealt with, in which the tetrahedron can be always arbitrarily orientated to the observer, in that, for example, it is being carried by another person, the simplest position may be given to the entrance-surface, namely, that perpendicular to the incident pencil, by means of a sighting device. There results then, in slight rotation of the reflector, only an increase in divergence proportional to the index of refraction of the tetrahedron.

Since through the sub-division of the incident pencil into six emerging pencils, the energy of light is likewise divided, it is desirable to combine some of the pencils and thereby increase their intensity. If one axis of rotation of the triple-reflector coincide with another, then two pencil-pairs coalesce to form one pair, and four pencils only remain. If the third axis of rotation coincide with the double axis formed as above from the first and second, making a threefold axis, then but two pencils remain, of which each is originated through coalescence of three pencils. Exact coalescence of all six pencils into one corresponds to the transformation of the triple-reflector into a central-reflector, which is inapplicable for the present method of measurement. The method is, however, still practicable, when the coalescence is not quite complete, that is, overlapping of the cross sections of the pencils occurs at the place of observation. The three usable cases, that 6, 4, 2 pencils (3, 2, 1 axes of rotation) exist, are realized by the construction of the triple-reflector with 0, 1, 2 right angles respectively.

If only one angle be a right angle, that is, there be only two axes of rotation, one simple and one double axis, then it depends upon the two other angles, how these axes of rotation lie to one another. Since the magnitude of rotation is of the same order as the excess of the largest angle over 90°, and since at most a slight amount of the magnitude of rotation is desirable, the two angles hereafter shall be supposed to differ but a little from 90°. The two axes in this case lie approximately in the reflecting plane opposite the right angle. The two limiting cases consist in, firstly that the two axes of rotation coincide with one edge of the reflector, that is, a threefold axis occurs, and secondly, that the two axes of rotation form a right angle one with the other, and in addition thereto have equal but opposite inclination with respect to the edge of the reflector. If the angles be both greater or both smaller than 90°, then the double axis lies outside the reflector. If one be greater and the other smaller than 90°, the double axis lies within.

In rectangular position of the two axes of rotation to one another, determination of distance becomes exceedingly simple. If that axis of rotation (simple or double), which lies outside the reflector, be placed at right angles to the plane of movement, then the other lies in the latter; the pencils corresponding to the first give, with the triple-reflector, the distance immediately, in the case of the tetrahedron, as above mentioned, only in simple combination with the pencils of the other axis of rotation.

If the reflector system have a threefold axis and correspondingly supply only two pencils, then the edge of the reflector, which forms the axis of rotation, will be placed, so that the diagonal of the cube passing through the center of the reflector fall in the plane of movement, in order to intensify the illumination.

If there be a tetrahedron having a threefold axis of rotation, the simplest way is to lay the entrance-surface at right angles to the plane of movement and also at right angles to the projection of the edge, forming the axis of rotation, on this plane. In this arrangement are the distance of the tetrahedron and the angle, which the incident pencil forms with the entrance-surface, easily to be determined from two measured data, namely, the pencil-distance and the inclination between the plane of the pencils and the plane of movement. So long as the incident pencil impinges approximately at right angles on the entrance-surface, one of the measurements, namely, the pencil-distance or its projection on the plane of movement, suffices.

In the annexed drawing: Figure 1 is an elevation of a reflector forming part of an appliance according to the invention. Fig. 2 is a plan view of the said appliance. Fig. 3 is a cross-section through the total pencil entering the reflector. Fig. 4 is a cross-section through the partial pencils emerging from the reflector. Fig. 5 is an elevation of the appliance with cross-sections through the partial pencils at the place of observation. Fig. 6 is another plan view of the appliance, on a reduced scale, showing the crossing of the partial pencils emerging from the reflector.

The object at the distance to be measured is a glass tetrahedron A, Figs. 1 and 2, presenting a solid angle, approximately that of a cube, the three faces of which meeting in the edges I, II and III are the reflecting surfaces. The entrance surface $a\ b\ c\ d\ e\ f$ stands at right angles to the diagonal of the cube. Of the three angles contained by the reflecting surfaces, those two at the edges II and III are right angles, so that there exists only one single (threefold) axis of rotation lying in that edge the angle at which is not a right angle, i. e., in the edge I. This angle at I is smaller than 90°, but only by a very small amount $\delta$, Fig. 1. If this amount and the index of refraction be known, all constants of construction of the tetrahedron are known. In Fig. 1 instead of the angles between the faces (at the edges I, II and III) the opposite angles between the edges are referred to, which in the present case are equal to them. The three corners of the tetrahedron at the entrance surface are truncated by plane sections, which lie perpendicular to this surface and give it the form of a hexagon $a\ b\ c\ d\ e\ f$.

Particulars regarding the position of the tetrahedron A to the horizon are afforded likewise by the Figs. 1 and 2, from which it will be seen that the entrance-surface $a\ b\ c\ d\ e\ f$ lies vertical, the diagonal of the cube horizontal. The edge I of the reflector with the angle between the faces $90° - \delta$, which acts as axis of rotation, lies above the diagonal of the cube in the same vertical plane. Further, if it be granted, that the source of light lie in the same straight line as the diagonal of the cube, then the orientation of the tetrahedron with respect to the source of light is also completely solved.

In Fig. 2 the illuminating device is also represented, which is a search light, i. e., a combination of a source of light and an optical system, which latter renders a portion of the rays emitted by the source of light parallel to one another and may be either a collective lens system or a concave mirror.

This search light is in reality very far removed from the tetrahedron, even much farther off than would appear from Fig. 6. It is in this case supposed to consist of a parabolic mirror B with its axis in the same straight line as the diagonal of the cube, and of a point of light placed at the focus $g$ of the mirror. The diameters of the tetrahedron A and of the reflector B are chosen, so that the pencil of rays parallel to the diagonal of the cube, which is produced by the illuminating device, on entering the tetrahedron completely fills the hexagonal aperture of the latter. In Figs. 2 and 6 the left and right halves of this pencil are distinguished by differently dotted rays, while the plane primary pencil emitted in the vertical plane of the axis is characterized by a full drawn ray.

The hexagonal pencil, which enters the tetrahedron, can be thought to be composed of six different partial pencils, each of which meets the three reflecting surfaces in different order of sequence. The total pencil is resolved into these six partial pencils by three planes of separation, which intersect each other in the diagonal of the cube. Their three traces on the entrance-surface of the tetrahedron would coincide in the elevation Fig. 1 with the six interrupted lines drawn in the tetrahedron, of which lines the dashes show the reflector edges I, II and III and those dotted the images of the former. Accordingly the cross section of the total entering pencil may be supposed to consist, as represented in Fig. 3, of six quadrilateral partial sections $a° b° c° d° e° f°$. Upon their exit again out of the tetrahedron the partial pencils have attained the places as represented in cross section in Fig. 4. It is apparent that the places of the emerging partial pencils are opposite to those of the entering ones and that therefore the partial pencils $b° c° d°$ admitted through the right half of the aperture of the tetrahedron emerge again through the left half and inversely, as indicated also in Figs. 2 and 6.

To the threefold axis of rotation of the tetrahedron corresponds a grouping of the six emerging partial pencils into two triple partial pencils $b° c° d°$ and $e° f° a°$, which lie symmetrical to the axis of the entering total pencil. Of the above three planes of separation the vertical one decides the grouping, because it contains the axis of rotation I. The three partial pencils $b° c° d°$ entering on the right hand of this plane and the other three $e° f° a°$ entering on the left hand of it emerge left and right respectively, again combined into a triple partial pencil. Since the angle at the edge I is less than a right angle, the two emerging triple partial pencils $b° c° d°$ and $e° f° a°$ cross each other. As supposed in Figs. 2, 5 and 6 this has already taken place long before the pencils arrive at the place of the illuminating device B, so that they pass by on either side of it. On account of the great inclination of the axis of rotation I with respect to the horizon and on account of the insignificance of the magnitude of rotation consequent upon the trifling deviation $\delta$ of the angle at I the cross sections of the pencils in Fig. 5 show no perceptible elevation above the reflector B.

With the appliance described the method of determining the distance turns out to be very simple, if it be supposed that the orientation of the tetrahedron to the source of light and its constants of construction be known to the measurer, by which means then also the angle of convergence between the pencils is indirectly given. As mentioned in the commencement, the distance is the quotient obtained from the pencil distance and the angle of convergence between the pencils. The distance between the pencils is accessible to direct measurement by fixing the places of the margins of the pencils. The margin of a pencil is easily found by moving the head to and fro in the plane of the pencils transversely to them, and in so doing observing with one eye in which position of the head occurs the appearance and extinction of the flash. In the present case, where the two triple partial pencils cross each other, the two outer margins of the cross sections of the pencils constitute, as indicated in Figs. 2 and 5, the pencil-distance $h$.

The outer margins are formed by the two plane primary pencils, which are originated from the plane primary pencil emitted from the illuminating mirror in the vertical plane of the axis, these three plane primary pencils being represented in Figs. 2 and 6 by full lines. The crossing line of the two emerging plane primary pencils passes through the center of the reflector, so that the pencil-distance at the reflector, which according to the rule given above should be added to or subtracted from the pencil-distance at the place of observation, becomes zero.

What I claim as my invention, and desire to secure by Letters Patent, is—

1. The combination with a source of light of a triple-reflector slightly deviating from a central-reflector in that the three reflecting surfaces include at least one angle which differs from 90°.

2. The combination with a search light of a glass tetrahedron, three surfaces of which constitute nearly a central-reflector in that at least one of their three angles differs from 90° and the fourth surface of which forms equal angles with the three reflecting surfaces.

3. The combination with a source of light of a triple-reflector slightly deviating from a central-reflector and so orientated to the horizon that an axis of rotation lies in a vertical plane.

4. The combination with a source of light of a triple-reflector, of the three angles of which two are right angles and the third only slightly deviates from a right angle, this reflector being so orientated to the horizon that the axis of rotation lies in a vertical plane.

In testimony whereof I have signed my name to this specification in the presence of two subscribing witnesses.

RUDOLF STRAUBEL.

Witnesses:
 PAUL KRÜGER,
 FRITZ SANDER.